(12) United States Patent
Gurevich et al.

(10) Patent No.: US 6,651,886 B2
(45) Date of Patent: Nov. 25, 2003

(54) OPTICAL CODE READERS WITH HOLOGRAPHIC OPTICAL ELEMENTS

(75) Inventors: Vladimir Gurevich, Ronkonkoma, NY (US); Mark Krichever, Hauppague, NY (US); Igor R. Vinogradov, Bay Shore, NY (US); Matthew Blasczak, Coram, NY (US); Thomas D. Bianculli, Manorville, NY (US); Shinji Nagano, Cyofu (JP); Mehul Patel, Fort Salonga, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 75 days.

(21) Appl. No.: 09/833,861

(22) Filed: Apr. 13, 2001

(65) Prior Publication Data

US 2002/0148900 A1 Oct. 17, 2002

(51) Int. Cl.$^7$ .................................................. G06K 7/10
(52) U.S. Cl. ............. 235/454; 235/462.33; 235/462.34; 235/462.35
(58) Field of Search ........................ 235/462.01, 462.34, 235/462.33, 462.35, 454

(56) References Cited

U.S. PATENT DOCUMENTS

| | | | | |
|---|---|---|---|---|
| 4,800,256 A | * | 1/1989 | Broockman et al. ......... | 235/457 |
| 5,107,100 A | | 4/1992 | Shepard et al. | |
| 5,230,088 A | | 7/1993 | Kramer, Jr. et al. | |
| 5,495,097 A | | 2/1996 | Katz et al. ................. | 235/462 |
| 5,514,861 A | | 5/1996 | Swartz et al. | |
| 5,821,519 A | | 10/1998 | Lee et al. .................. | 235/462 |
| 5,942,157 A | | 8/1999 | Sutherland et al. .......... | 252/528 |
| 6,002,925 A | | 12/1999 | Vu et al. | |
| 6,040,928 A | | 3/2000 | Popovich ..................... | 359/15 |
| 6,082,862 A | | 7/2000 | Popovich ..................... | 353/30 |
| 6,091,521 A | | 7/2000 | Popovich ..................... | 359/15 |
| 6,094,283 A | * | 7/2000 | Preston ........................ | 359/15 |
| 6,101,008 A | | 8/2000 | Popovich ..................... | 359/15 |
| 6,101,483 A | | 8/2000 | Petrovich et al. | |
| 6,115,151 A | | 9/2000 | Popovich ........................ | 359/9 |
| 6,115,152 A | * | 9/2000 | Popovich et al. .............. | 353/30 |
| 6,124,954 A | | 9/2000 | Popovich et al. .............. | 359/13 |
| 6,130,872 A | * | 10/2000 | Sugiura et al. .......... | 369/112.04 |
| 6,138,915 A | | 10/2000 | Danielson et al. ........... | 235/472 |
| 6,158,659 A | | 12/2000 | Dickson et al. .............. | 235/462 |
| 6,172,778 B1 | * | 1/2001 | Reinhorn et al. .............. | 359/15 |
| 6,185,016 B1 | * | 2/2001 | Popovich ...................... | 348/40 |
| 6,305,607 B1 | | 10/2001 | Katz et al. | |
| 6,317,228 B2 | * | 11/2001 | Popovich et al. ............ | 349/201 |
| 6,336,587 B1 | * | 1/2002 | He et al. ................ | 235/462.22 |
| 6,340,114 B1 | * | 1/2002 | Correa et al. ........... | 235/462.01 |
| 6,415,982 B2 | | 7/2002 | Bridgelall et al. | |
| 6,504,629 B1 | * | 1/2003 | Popovich et al. .............. | 359/22 |
| 2002/0085516 A1 | | 7/2002 | Bridgelall | |

FOREIGN PATENT DOCUMENTS

WO 00/23831 4/2000

OTHER PUBLICATIONS

Popovich, Milan, Optical sensor, Aug. 3, 2000, PCT/US00/01191.*

R. L. Sutherland et al., Applied Physics Letters, 64/9:1074–76, (American Institute of Physics) (Feb. 28, 1994), Electrically Switchable Volume Gratings in Polymer– dispersed Liquid Crystals.

DigiLens Internet Article, http://www.digilens.com, 12 pages, (2000 DigiLens, Inc.) (Nov. 21, 2000).

* cited by examiner

*Primary Examiner*—Michael G. Lee
*Assistant Examiner*—Kimberly Nguyen
(74) *Attorney, Agent, or Firm*—Carter, Deluca, Farrell & Schmidt, LLP

(57) ABSTRACT

Holographic optical elements are configured and deployed in optical imagers and scanners to produce optical modification of output laser beams and light received and detected by the system. In some preferred embodiments electrically switchable holographic optical elements (ESHOEs) are employed for beam tilting, for varying spot size and shape for modifying system focal distance and field of view, for changing laser aiming patterns and/or for color imaging.

28 Claims, 7 Drawing Sheets

OPTICAL CODE READERS WITH HOLOGRAPHIC OPTICAL ELEMENTS

FIELD OF THE INVENTION

The present invention relates to optical code readers using holographic optical elements, especially optical code readers having input or output optical paths which include one or more electrically switchable systems including holographic optical elements for modifying the optical characteristics of the code reader, for example, to modify the field of view of the code reader.

BACKGROUND AND OBJECTS

Optical Code Readers

Optical code readers are known in the prior art for reading various symbologies such as UPC bar code symbols appearing on a label or on the surfaces of an article. The optical code symbol itself maybe a bar code pattern of indicia comprised of a series of bars of various widths spaced apart from one another to bound spaces of various widths, the bars and spaces having different light reflecting characteristics. The readers in scanning or imaging systems electro-optically transform the graphic indicia of a target symbol into electrical signals, which are decoded into information, typically descriptive of the article or some characteristic thereof. Such information is conventionally represented in digital form and used as an input to a data processing system for applications in point-of-sale processing, inventory control and the like. Optical code readers are of two general types: scanning laser beam code readers and imaging code readers.

In the laser beam scanning systems known in the art, the laser light beam is directed by a lens or other optical components along the light path toward a target that includes a bar code symbol on the surface. The moving-beam scanner operates by repetitively scanning the light beam in a line, pattern or series of lines across the symbol by means of motion of a scanning component, such as the light source itself or a mirror disposed in the path of the light beam. The scanning component may either sweep the beam spot across the symbol and trace a scan line across the pattern of the symbol, or scan the field of view of the scanner, or both.

Optical code reading systems also include a sensor or photo detector which detects light reflected or scattered from the symbol. The photo detector or sensor is positioned in the scanner in an optical path so that it has a field of view which ensures the capture of a portion of the light which is reflected or scattered off the symbol. This light is detected and converted into an electrical signal.

Some optical code reading systems are "retro-reflective." In a retro-reflective system, a moving mirror is used to transmit the outgoing beam and receive reflected light. Non-retro-reflective systems typically employ a moving mirror to transmit the outgoing beam and a separate detection system with a wide, static field of view.

Optical codes can also be read employing imaging devices. For example an image sensor may be employed which has a two dimensional array of photo sensor cells which correspond to image elements or pixels in a field of view of the device. Such an image sensor may be a one dimensional (linear) sensor or a two dimensional area sensor such as a charge coupled device (CCD), CMOS device, charge modulated device (CMD) or charge injection device (CID). Associated circuitry produces electronic signals corresponding to a one or two-dimensional array of pixel information for a field of view.

It is known in the art to use a photo detector and objective lens assembly in an imaging optical code reader. In the past, such systems have employed complex objective lenses assemblies originally designed for use in relatively expensive video imaging systems. Such systems may have a single sharp focus and a limited depth of field, which along with conventional aiming, illumination and signal processing and decoding algorithms, limits the versatility and working range of the system.

Other known imaging systems are designed primarily for reading optical code. Such reading systems involve the assembly and alignment of several small parts. These parts may include a lens, an aperture and a 2D optical detector array such as a CCD chip. Such a structure is illustrated, for example, in U.S. patent application Ser. No. 09/096,578 to Correa et al. entitled "Imaging Engine and Method for Code Readers" filed Jun. 12, 1998 and assigned to Symbol Technologies, Inc. The Correa et al. application is hereby incorporated by reference herein.

Electrically Switchable Holographic Optical Elements

Electrically switchable holographic optical elements (ESHOEs) are known in the art. Such devices may consist of a pair of plates which may be transparent or reflective. A polymer-dispersed liquid crystal material may be located between the plates. One or more interference patterns are formed in the material and define a volume hologram. The ESHOE has optical properties that changes in response to an electrical field applied to the plates. The composition and fabrication of such devices are discussed, for example, in U.S. Pat. No. 5,942,157 to Sutherland et al. entitled "Switchable Volume Hologram Materials and Devices."

The volume hologram is angle and wavelength selective, which makes a wide variety of applications possible. The hologram can be recorded as a reflection or transmission hologram. The volume hologram may be created by exposing a mix of monomers and liquid crystal located between the plates to intersecting laser beams, giving rise to an interference pattern. Photo-polymerization is selectively initiated by the light to form a matrix of polymer and liquid crystal droplets. When an electric field is applied to the plates the orientation of the liquid crystal molecules changes, resulting in erasing the hologram. When the field is removed, the hologram returns. Application-specific ESHOEs are offered by DigiLens, Inc., of Sunnyvale, Calif.

It has been proposed to use ESHOEs, for example, for projecting images on a projection screen, or providing displays in which the ESHOEs perform simple optical functions commonly associated with traditional optical devices, such as those performed by lenses, prisms and mirrors. It has also been proposed to use ESHOEs in sophisticated optical manipulations such as varying the light intensity with respect to a specific direction. The construction and application of such devices are discussed, for example, in U.S. Pat. No. 6,040,928 to Popovich entitled "Holographic Desktop Monitor." It has been suggested that the DigiLens ESHOEs be used for applications including beam steering, diffractive correction or wavelength selective filtering.

It is an object of the present invention to provide novel applications for volume holograms in optical code readers.

It is another object of the present invention to provide novel applications for ESHOEs in optical code readers.

These and other objects and features of the invention will be apparent from this written description and drawings.

SUMMARY OF THE INVENTION

The present disclosure includes various systems and methods employing diffractive or holographic optical elements for improving the performance of optical code readers or providing new functions in such devices.

In one embodiment of the present invention an optical code reading system employs a photo sensor with an array of cells for producing electrical signals responsive to an image directed to said sensor. An optical system sequentially focuses images on the sensor corresponding to at least two different fields of view which may be partially overlapping or completely non-overlapping. The optical system which performs this function includes at least one electrically switchable holographic optical element (ESHOE) for switching between the fields of view. Electronic control circuitry switches the ESHOE to change fields of view. Image data from one or more of the fields of view is selected for decoding in the conventional fashion to extract information from an optical code symbol located in the selected field(s) of view. The system may include processing hardware and/or software for stitching together image portions from at least two of the fields of view to form a composite image with resolution higher than the resolution obtainable with a single exposure of the photo sensor. The system may be used to obtain data sufficient to image a document and to read a bar code which constitutes a portion of the document.

The optical system used to implement this embodiment may include at least one lens through which an input optical path of the system passes and an ESHOE in the optical path. The ESHOE may be formed with a volume hologram which tilts the input optical path of the system when voltage is removed from the plates thereof.

In another embodiment of the present invention an imaging system is adapted for reading an optical code symbol. The system includes a photo sensor having a two dimensional array of cells. An optical system directs images to the photo sensor. The optical system includes at least one ESHOE switchable between two states to vary the optical properties of the images directed to the photo sensor. An electronic switching system, under microprocessor control, may be employed to switch the ESHOE to select an image of the optical code symbol which is readily decodable. Such a system may provide at least two different system magnifications and, thereby, provide a zooming function. Additionally or alternatively, the imaging system may be used to switch between two states which provides different focal distances.

In another embodiment of the present invention, an imager based optical code reading system is equipped with a range finder for determining the distance of an object in a field of view of the system. Such a system employs an image sensor having a primary input optical axis and a field of view. An ESHOE is located on the primary input optical path for selectively tilting the input optical axis of the image sensor. Signal processing circuitry detects a shift in position of an image of the object on the image sensor caused by the tilting of the input optical axis. The distance of the object is determined by triangulation from the detected shift in position. In one embodiment the shift in position of an image of the object is detected by detecting a shift in position of an image of an edge of an optical code symbol on the object. In another embodiment the shift in position of an image of the object is detected by detecting a shift in position of an image of an aiming spot projected by the system onto the object. In either case, hardware and/or software systems responsive to the distance determination may be used to adjust the focal distance of the system.

In another embodiment of the present invention a laser beam source for a laser optical code scanning system employs one or more ESHOEs for selectively modifying an output laser beam. In such systems an ESHOE in an output beam path of the system laser diode is formed with a volume hologram for selectively modifying the laser beam shape in response to a control signal. Control circuitry switches the ESHOE to restore and erase the volume hologram formed in the ESHOE. In one embodiment the volume hologram contains an interference pattern presentation of a cylindrical lens to produce an elliptical laser beam spot. Switching the ESHOE switches the laser beam spot between an elliptical and a circular shape. In another embodiment the ESHOE is reflective and functions as a moving mirror for scanning the laser beam across the optical code.

In another embodiment of the present invention plural transmission mode ESHOES are stacked together to provide multiple, switchable beam shaping functions. At least one of the ESHOEs may be used to control beam ellipticity and at least one other ESHOE may be used to control the location of the narrowest portion of the laser beam waist. A return signal of detected reflections of the laser beam may be monitored to determine the appropriate laser beam shape and the ESHOEs controlled to produce the laser beam shape producing the most effective scanning.

The present invention also includes methods for changing projected messages or aiming patterns from an optical code reader. One such method employs diffractive optical elements formed so that an incident coherent light beam is transformed into at least two different aiming patterns. A first pattern may be projected at a relatively high optical power and a second pattern projected at relatively lower optical power. The power of the coherent light beam directed at the diffractive optical element is varied to vary the appearance of the projected aiming pattern. In one example the power of the coherent light beam is varied to selectively reduce the output power to levels at which the first pattern is visible to a user and the second pattern is too dim to be visible to the user. In effect, at the lower power level, the second pattern is turned off. At the higher power level both aiming patterns appear to form a composite aiming pattern.

In another embodiment of the present invention a color imager is implemented with one or more ESHOEs which sequentially direct different wavelengths of incident light to the cells of the photo sensor.

The foregoing has been provided as a convenient summary of preferred embodiments. However, the invention to be protected is defined by the claims herein and the range of equivalents properly accorded hereto.

DETAILED DESCRIPTION

I. Multiple Field of View Imager

In an optical code reader using imaging technology, the system field of view may be effectively expanded by use of one or more ESHOEs. An example of an implementation of such a system is illustrated in FIG. 1.

Advantageously, imaging code readers can be used for purposes other than code reading such as imaging objects, scenes or documents. For example, an imaging code reader could be configured to scan a bar code in a document and also take a picture of the document. Such an approach might be used to read a bar code symbol corresponding to a prescribed pharmaceutical and to make a copy of the script itself. The problem with such an approach using conventional imaging technology is that obtaining reasonable resolution of the whole document typically requires a photo sensor array with a much larger number of cells than would be required to read a bar code. Though such sensors are available, they increase the cost of the system.

However, an imager with an electrically switchable field of view can provide the desired functions in an imager using a relatively small array photo sensor, for example, a sensor array having one third the number of cells which would be needed to produce the image in a single frame at the same resolution. Such a system is illustrated in FIG. 1.

Figure 1:
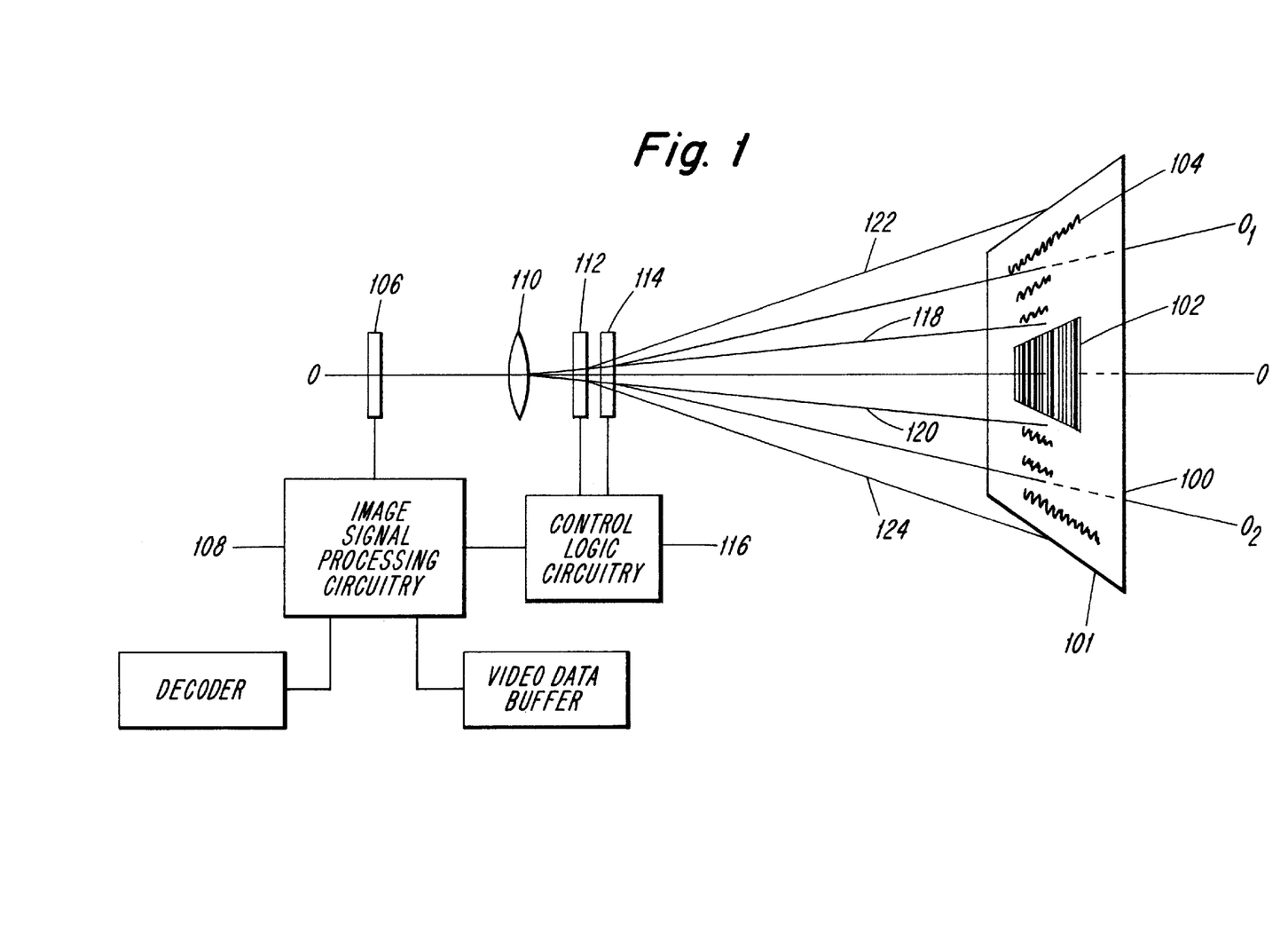
FIG. 1 is a partially schematic, partially pictorial illustration of a target code symbol and document and an imaging system with multiple electrically switchable fields of view in accordance with a preferred embodiment of the present invention.

FIG. 1 is a partially schematic, partially pictorial illustration of an imaging system with multiple electrically switchable fields of view. A document 100 is located in a target plane 101, preferably at an optimum focal distance for the system. The document in the example carries a bar code symbol 102 and additional items such as text 104 or pictures (not shown).

The code reading system includes an area imaging photo sensor 106 such as a CCD and associated image signal processing circuitry 108. The sensor and associated optical system may be optimized for reading optical codes of a selected module size in a selected range from the imager. Objective optics such as an objective lens 110 for focusing an image onto the photo sensor are located in a principle optical path of the system (axis 0-0). Though the principle optical path 0-0 is shown as a straight line in FIG. 1, it will be understood that the principle optical path may be bent or folded in accordance with the particular optical and mechanical dimensional constraints of the system.

One or more ESHOEs (112 and 114) are located in the optical path of the system. The ESHOEs are formed with volume holograms which deflect the input light beam imaged by the system. When voltage is applied to both ESHOEs 112 and 114 by control logic circuitry 116, the holograms of both ESHOEs are erased and the input beam path is centered on axis $0-0_1$ with a field of view bounded at the top and bottom by lines 118 and 120, respectively. In this mode the bar code may be read. When the voltage to ESHOE 112 is turned off, its volume hologram is restored and the input beam path is deflected to line $0-0_1$ with a field of view bounded on the top and bottom by lines 122 and 118, respectively. When the voltage to ESHOE 112 is turned back on and the voltage to ESHOE 114 is turned off, the functions of the devices are reversed. As a result the input path is deflected to line $0-0_2$ with a field of view bounded at the top and bottom by lines 120 and 124, respectively.

The combination of the three fields of view covers the entire document 100. The pixel information obtained from the three configurations can be stitched together by the image processing circuitry to produce a video signal with up to three times the pixel information which would be obtained from a single exposure of the photo sensor 106.

It will be understood that various configurations and numbers of ESHOEs can be deployed to tile the desired image plane to enhance the resolution of the image to the required degree. In addition the ESHOEs can be formed to provide auxiliary optical functions such as the correction of field aberration. In this way an optical code reader and a video imager can be implemented using a photo sensor array with a relatively small number of cells.

II. Zoom Imager

Another aspect of the present invention relates to implementation of a zoom imager which can provide increased working ranges and selective fields of views for an optical code reader or imager. The system can be implemented with ESHOEs and without moving parts, such as the moving lens elements commonly used in zoom lens systems.

Figure 2:
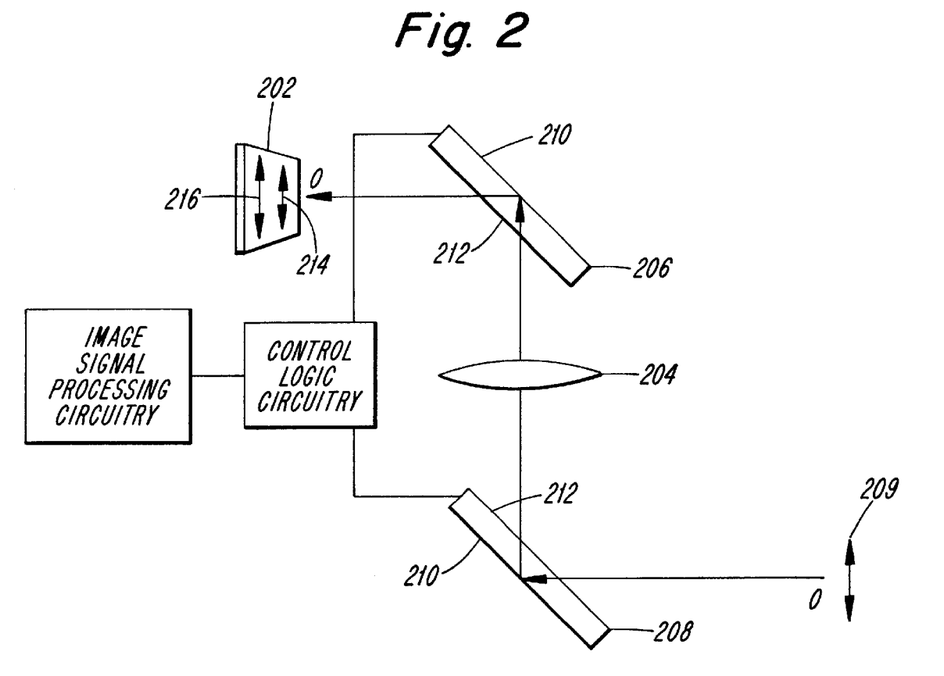
FIG. 2 is a schematic illustration of a dual zoom imager embodiment of the present invention.

FIG. 2 is schematic illustration of a dual zoom imager embodiment of the present invention. In FIG. 2 an object 209 such as a bar code is imaged by the imager system. A photo sensor 202, such as a CCD is located on an input optical path 0-0 of the system. Also located on the input optical path is an objective lens 204 and two reflective ESHOEs 206 and 208. The ESHOEs each have one reflective plate 210 and one transmissive plate 212. As shown the ESHOEs act as folding mirrors and direct light from the object 209 to the photo sensor 202. The ESHOEs are formed with volume holograms to refractively duplicate the effects of a curved mirror to form a defractive version of a Newtonian reflective magnification system.

The ESHOEs are controlled by control logic circuitry which selectively applies voltage to the plates of the ESHOEs 206 and 208. In a first mode of operation, the voltage to ESHOE 206 is turned off to restore the volume hologram while the voltage to ESHOE 208 remains on thus erasing the volume hologram in ESHOE 208 so that it acts like a planar mirror. In this first mode of operation a first magnification is achieved as indicated by image 214 focused on the photo sensor 202.

In a second mode of operation, the voltage to ESHOE 206 is turned on to erase the volume hologram and convert the ESHOE 206 to a planar mirror. The control voltage to ESHOE 208 is turned off to restore the volume hologram of different magnification in ESHOE 208. In the second mode of operation a second magnification is achieved (a difference dictated by the different effective curvatures of the volume holograms of the two ESHOEs). This second or zoom magnification is indicated in the image 216 of increased size. In this manner two or more magnifications can be achieved in the imager without the use of moving parts.

It will be understood that various combinations of ESHOES could be turned on and off in various combinations to achieve two or more different magnifications and fields of view.

III. Multiple-Focus and Beam Shaping in Imager or Laser Scanner

Figure 3A:
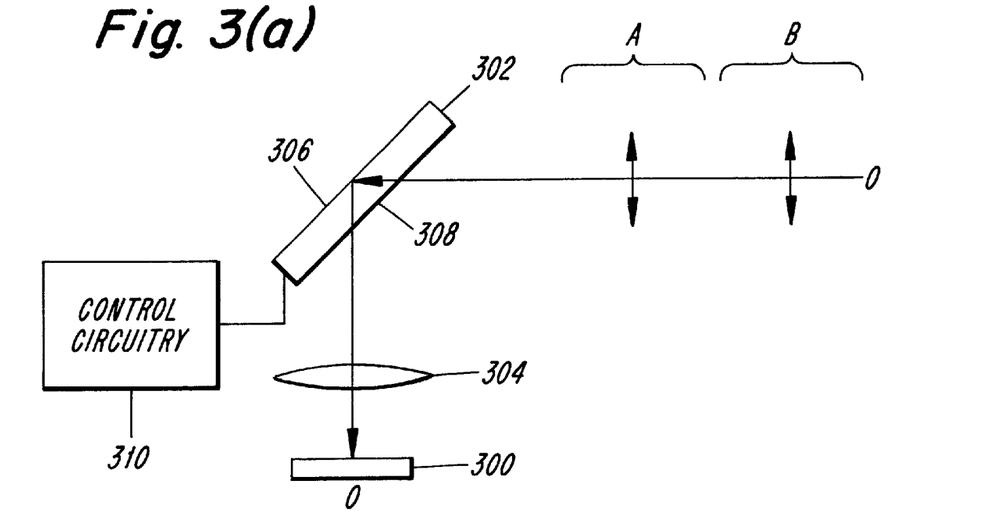
FIGS. 3(a) and (b) illustrate, respectively, an example of a multiple focus imager and an example of a multiple focus laser beam scanner embodiment of the present invention.
Figure 3B:
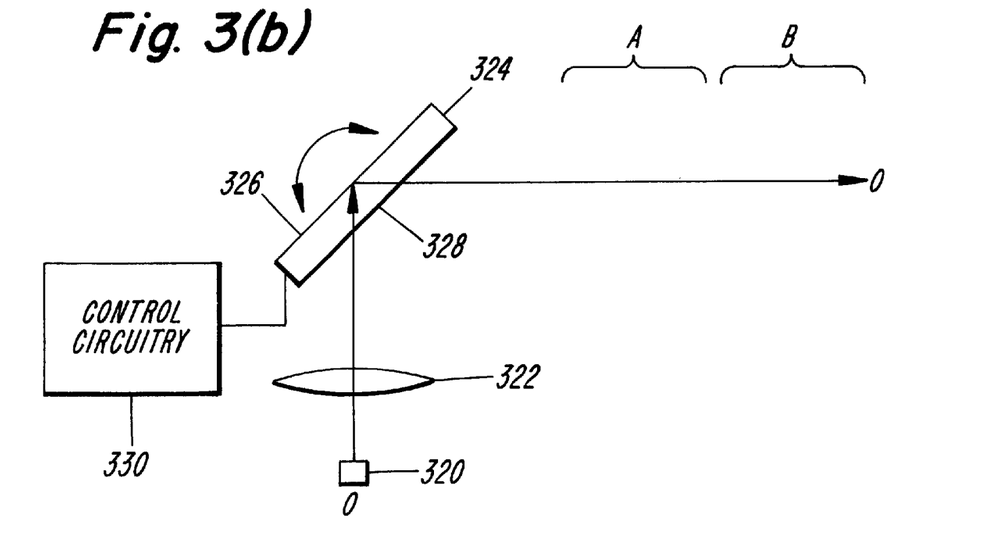

A multiple-focus imager or laser scanner can be implemented with ESHOEs to increase the working range of the laser scanner or imager. FIGS. 3(a) and 3(b) illustrate examples of such systems.

In FIG. 3(a) an imager system employs an area photo detector 300 as shown. An ESHOE 320 and objective lens 304 are located in the input optical path 0-0. The ESHOE 320 has a reflective plate 306 and a transmissive plate 308, and functions as a folding mirror. The ESHOE is formed with a volume hologram which changes the focal distance of the system. When voltage supplied by control circuitry 310 is turned on the hologram is erased and the ESHOE 320 acts as a planar mirror and the system has a focal distance indicated by a depth field A. When the voltage is turned off, the hologram is restored and introduces an optical power (and aberration correction if needed) for a second focal position indicated by depth field B.

In FIG. 3(b) a moving mirror laser scanner embodiment of the present invention is shown. A laser beam source 320 such as a laser diode is located on optical output path 0-0. Beam focusing lens 322 and ESHOE 324 are located on path 0-0. The ESHOE 324 has a reflective plate 326 and a transmissive plate 328. The ESHOE functions as a mirror and may be driven to pivot as indicated by the double headed arrow in order to scan the laser beam across a target bar code. The ESHOE is formed with a volume hologram which focuses the laser beam for scanning at different distances (A&B) from the scanner. When voltage is supplied by control circuitry 330, the hologram is erased and the ESHOE acts as a planar (moving) mirror. When the voltage is turned off the hologram is restored and the beam is focused for scanning bar code in the second field depth B.

In another embodiment of the present invention the ESHOE 324 of FIG. 3(b) is formed with a volume hologram which causes the ESHOE to act like a cylindrical mirror, to introduce astigmatism into the scanning laser beam. The system is thus capable of selectively forming an elliptical spot when the ESHOE is turned on. When ESHOE is turned off the ESHOE acts as a planar mirror to reflect the laser beam without distorting the spot shape.

Elliptical laser spots have been conventionally used in scanning one and two-dimensional bar codes, for example, in orientations where the major axis of the ellipse of the spot is oriented parallel to the major axis of the bars and spaces which make up the code. In such a case the major axis of the ellipse is perpendicular to the scanning direction. The present invention provides an expedient way of forming different spot and beam shapes for different scanning needs.

IV. Range Finder in Imager or Laser Scanner

The use of laser scanners and imagers for range finding has been proposed. See for example, U.S. patent application Ser. No. 09/174,466 to Patel et al. entitled "Optical Code Reader for Producing Video Displays and Measuring Physical Parameters of Objects", assigned to Symbol Technology, Inc. and hereby incorporated by reference herein. Aspects of the present invention include the use of ESHOEs in range finding systems for imager or laser scanners.

Figure 4:
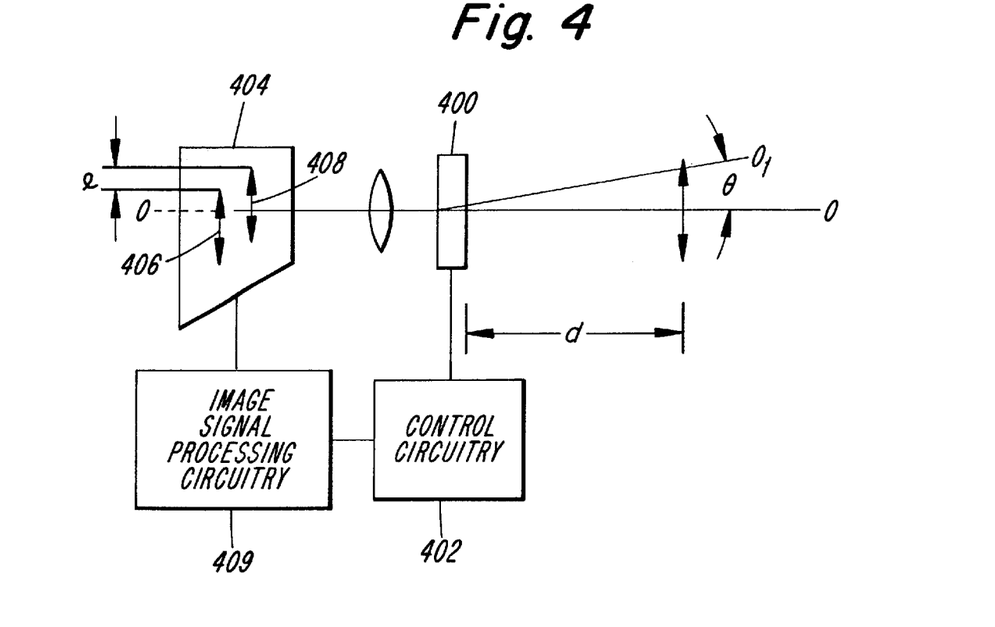
FIG. 4 illustrates a range finding embodiment of the present invention.

As shown in FIG. 4, an ESHOE 400 is located in the optical path of an imager or the detection system of a laser scanner. The ESHOE 400 is formed with a volume hologram which deflects the optical axis of the system from 0-0 to axis $0-0_1$. When no voltage is applied to the ESHOE 400 by the control circuitry 402, the volume hologram provides a tilt to the system optical axis by the desired angle $\ominus$. Application of a voltage to the plates of the ESHOE erases the volume and returns the optical axis to its original orientation.

The switching of the optical axis orientation produces a shift of the target image on the photo sensor 404 as shown by the two offset images 406 and 408. The magnitude of the shift is determined by an image signal processing algorithm. The distance to the target d can be calculated using triangulation methodology, the offset distance 1 and the known separation between the ESHOE and the detector and optical components of the imager or scanner. In a preferred embodiment the image processing would compare the before and after pictures, and determine how far the image shifted. Even allowing for the shift the second image may not be identical to the first besides the shift. However, signal processing algorithms can still be used to calculate the shift. One way to do this is to store the first image in memory, and then to correlate it with itself, and with the second image. Peak detectors could be used for both correlations to determine how many pixels are shifted. This number can be multiplied by the height of the pixels. Through the principle of similar triangles, and from knowing the effective distance from the input plane of the imager, triangulation can be used to determine the distance from the input image plane to the object. The software would have to intelligently determine for which object the triangulation is being performed, since there may be multiple objects in the field of view. This could be done by projecting an aiming pattern, and have the software detect the aiming pattern in both cases.

V. Message Generator

A laser included in the optical code reader may be employed to selectively project messages during or after code reading (for example "OK" "ERROR" "LOW BATTERY" etc.). This feature improves the ergonomics of scanners and terminals.

Figure 5:
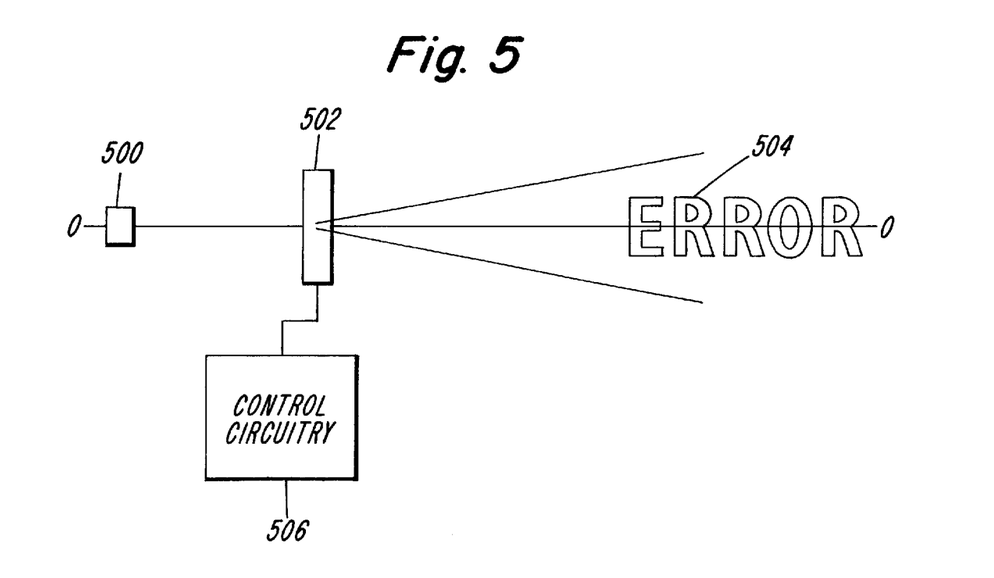
FIG. 5 illustrates a message generator embodiment of the present invention.

An example of the implementation of this aspect of the invention is illustrated in FIG. 5. A laser beam produced by a laser light source 500, (for example, a laser diode) is normally projected along a principle optical axis 0-0. The laser beam may be the scanning beam used in a laser scanner or an aiming laser beam used in an imager. An ESHOE 502 is formed with a volume hologram which produces a message 504 when illuminated by a laser beam. When the voltage is removed by the control circuitry 506 from the ESHOE 500, the volume hologram is restored and the message is projected where it can be read, for example, by the system operator.

VI. Stacked ESHOEs and Adaptive Beam Control

A further aspect of the present invention involves adaptive control of ESHOEs used in code reader applications and the use of stacks of ESHOEs to provide multiple, switchable optical functions. An example of such techniques is illustrated in the example of FIGS. 6(a) & 6(b).

Figure 6A:
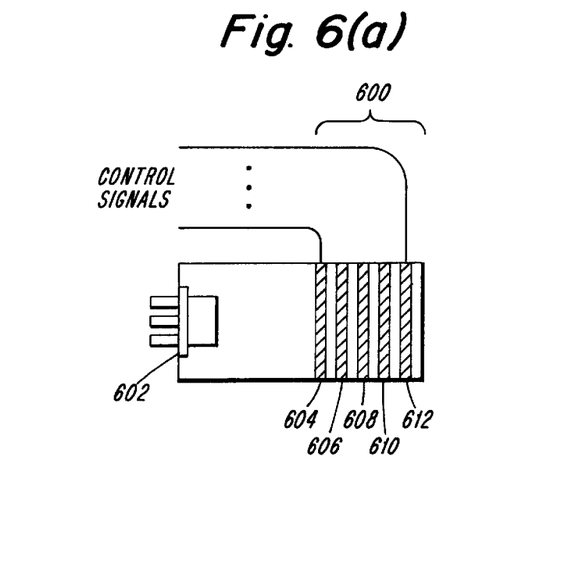
FIGS. 6(a) and (b) illustrate the use of stacked ESHOEs and adaptive beam control in certain embodiments of the present invention.

FIG. 6(a) shows the implementation of the multi-focus scanner using a stack 600 of Transmission mode ESHOEs, it being understood that optically equivalent systems may be constructed using reflection mode ESHOEs or a combination of both types. The techniques discussed below apply to either arrangement. One or more of the ESHOEs can be switched to obtain the optimum laser focusing. The ESHOEs may be configured to focus a laser beam in an optimum configuration for bar code scanning. One or more ESHOEs may be enabled by a logic circuit, to focus, for example, a long range axicon laser spot profile, an elliptical spot profile, or a round beam profile, with the beam waist focused nearer to or farther from the assembly. For example, ESHOE 604 may produce a near beam waist, ESHOE 606 may produce a far beam waist, ESHOE 608 may produce a round laser spot, ESHOE 610 may produce an elliptical laser spot, and ESHOE 612 may produce a long range axicon laser spot.

Figure 6B:
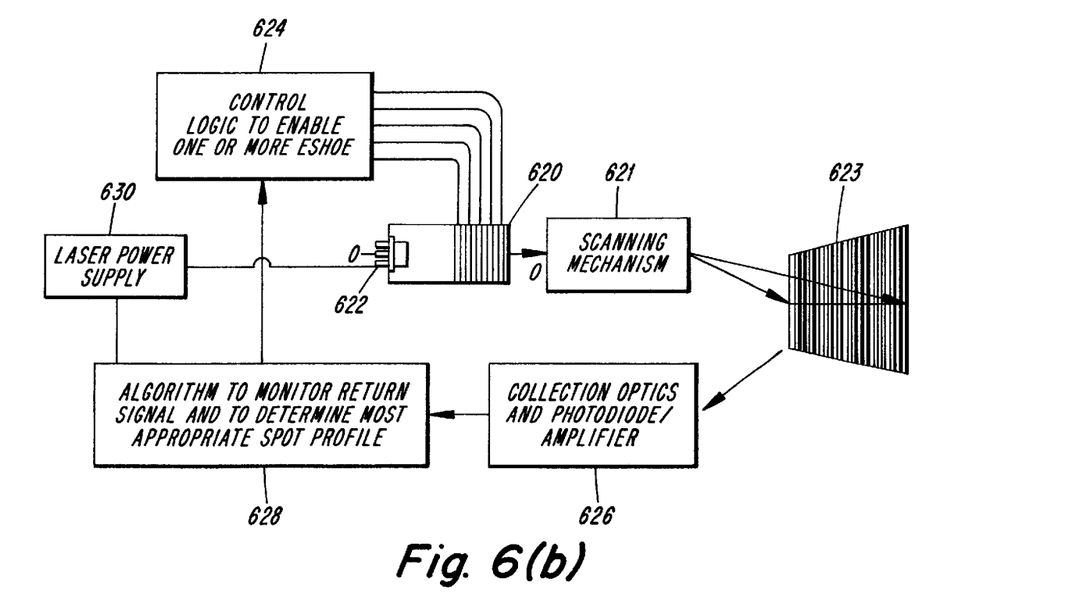

FIG. 6(b) shows a system which may be employed to achieve adaptive focusing using the optical system of FIG. 6(a). A default laser profile will be activated, with the Collection Optics and Photodiode/Amplifier network generating an electrical waveform in the analog or digital domain. This waveform will be processed by a microprocessor to determine the code type and signal to noise ratio. The microprocessor can then choose an optimum laser spot profile for decoding a bar code. For example an elliptical spot can be used to average out noise in a one-dimensional poor-quality bar code. A round spot can be used in an omnidirectional scanning configuration. The laser spot waist can be brought inwards if high density symbologies are detected. The laser spot waist can be pushed out if convolution distortion is too high. More laser power can be generated if the signal-to-noise ratio is too low. The scan angle can be adjusted to provide a better fit for the bar code in the scan line. Smart rastering can further enhance the technique by allowing the laser spot to only cover the symbol to be decoded.

As shown in FIG. 6(a), a stack 602 of transmission mode ESHOEs lies in an optical path 0-0 of a Laser diode 622. The laser beam is applied to a scanning mechanism 621 to scan a bar code 623. The ESHOEs are controlled by electronic control logic 624. At least one of the ESHOEs may be employed to control ellipticity in the spot of the output beam as discussed above. One or more other ESHOEs may be used to control the location of the narrowest portion of the laser beam waist. Reflected light is detected by a (photo sensor signal representative of the reflective light are produced by the photo sensor (in block 626) and the signals are passed to a microprocessor which executes an algorithm for monitoring the return signal and determining the appropriate spot profile (block 628). Control signals are applied to the control logic (block 624) which selectively enables one or more of the ESHOEs in the stack to control the laser beam produced by the output optical system in response to the detected return signal. Control signals may also be applied to the laser power supply (block 630) to control the power output of the laser 622.

VII. Method and Systems for Changing Laser Aiming Patterns

Figure 7:
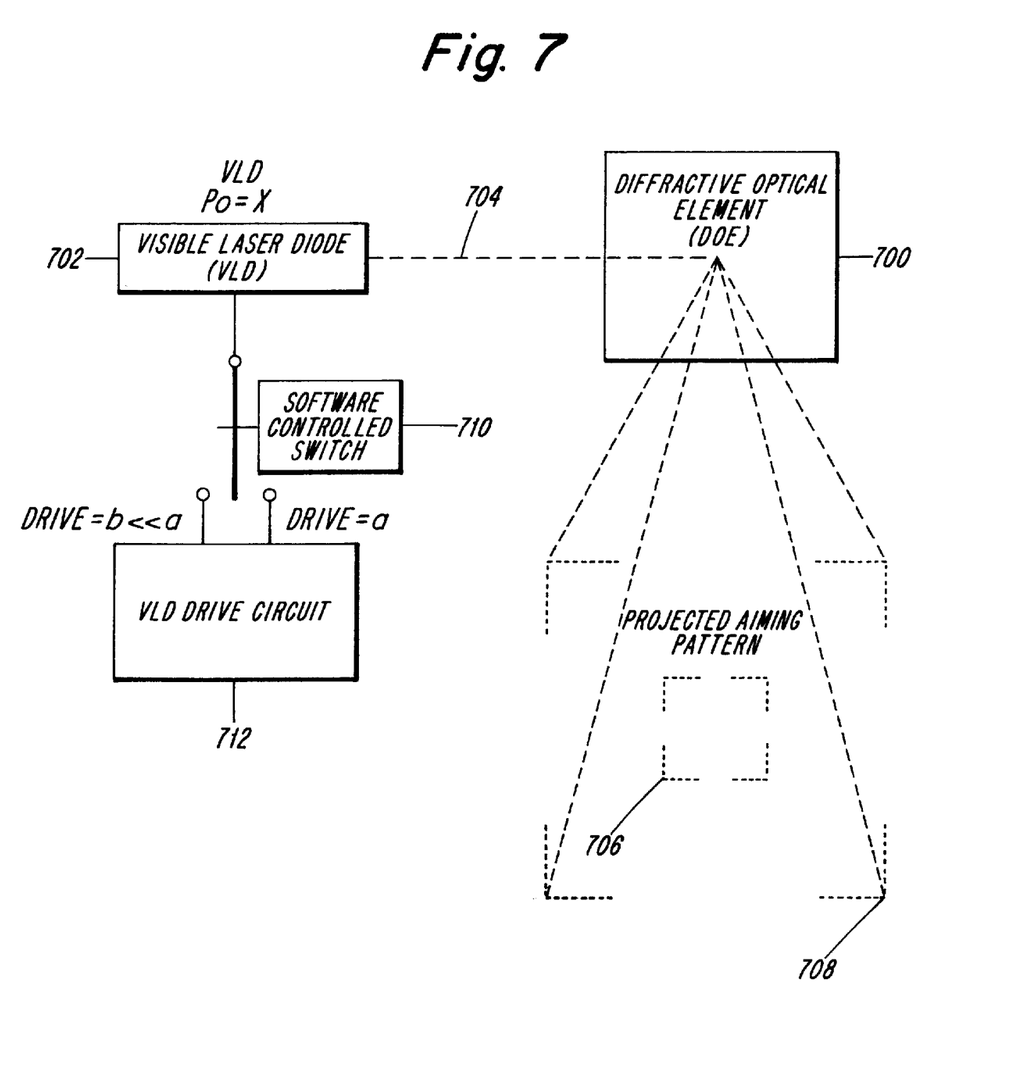
FIG. 7 illustrates a system and method of changing optical code reader aiming patterns in accordance with certain embodiments of the present invention.

FIG. 7 illustrates a method and system for changing laser aiming patterns employing a defractive optical element (DOE) 700. In this embodiment, rather than using ESHOEs, the power level of a visible laser diode (VLD) 702 which illuminates the DOE is changed in order to switch between aiming patterns projected by the DOE.

The DOE 700 is formed with a hologram such that an incident coherent light beam 704 from the VLD is transformed into at least two different aiming patterns. In the example of FIG. 7 two aiming patterns are shown: a first, inner pattern 706 (for example, for reading codes relatively close to the code reader) and a second pattern 708 (for example, for reading codes relatively far from the code reader). The hologram may be etched in the DOE such that the incident beam is diffracted into a first pattern projected at a relatively high optical power, i.e. a high percentage of the energy from the laser beam 704 is transformed and projected by the DOE into the aiming pattern 706. In contrast, the second pattern 708 is projected at a relatively lower efficiency and has a lower optical power.

By varying the power of the coherent light beam 704 directed at the diffraction optical element, the appearance of the projected pattern is varied. More specifically in the example of FIG. 7, at lower power level b the first pattern is visible to a user, but the second pattern is too dim to be visible. At a second, higher power level the second pattern becomes visible, thereby creating the composite of both patterns shown in FIG. 7.

A software controlled switch 710 may be employed to switch between two drive power levels (a and b) provided by VLD drive circuit 712, where the drive level a is much greater than the drive level b. The switch may be actuated manually by the user or automatically by the code reader's microprocessor in response to detected system performance or range finding. In this way the second pattern may be selectively "turned-off" leaving only the first pattern visible.

VIII. Method and Systems for Color Imaging

Figure 8:
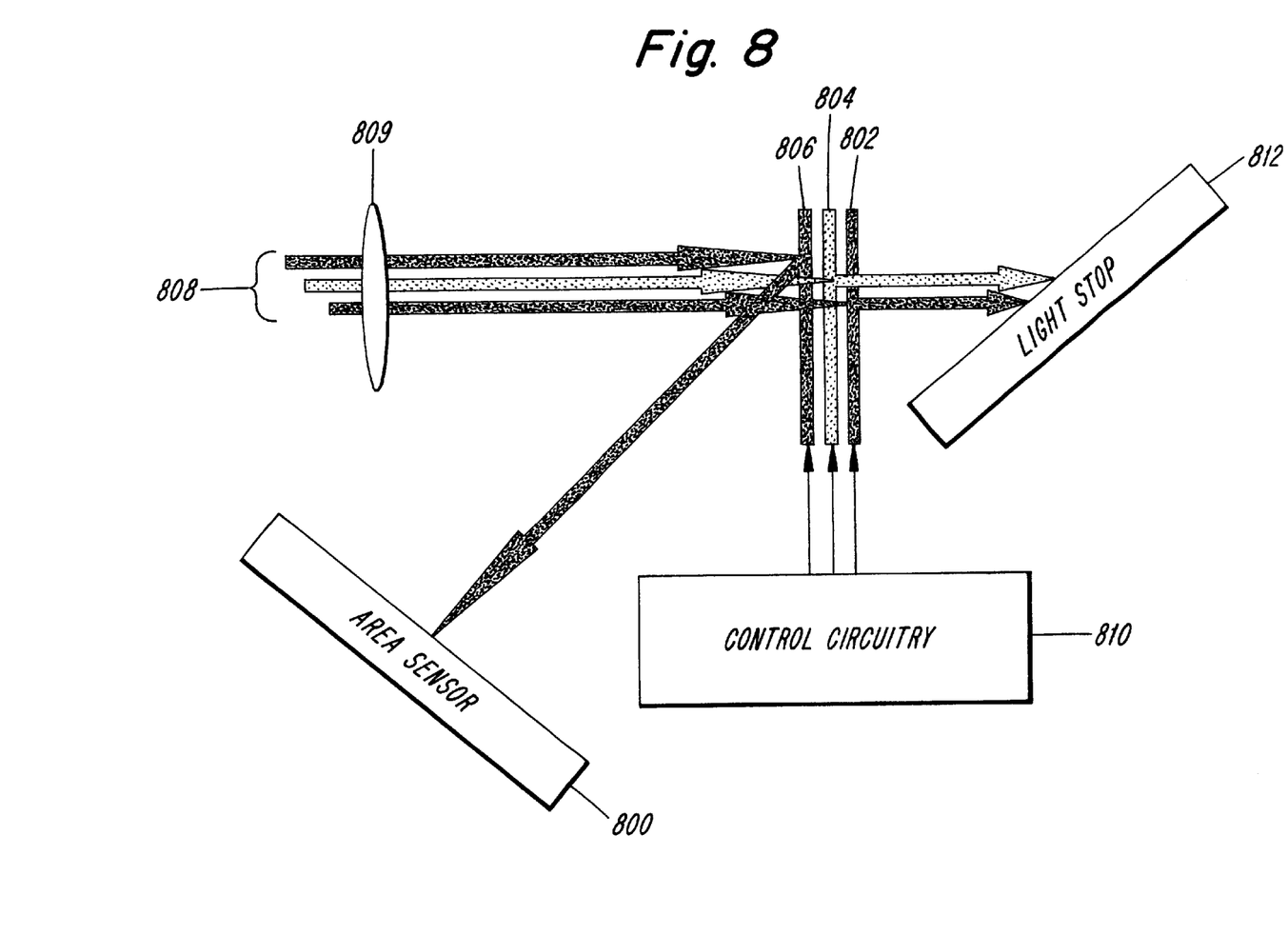
FIG. 8 illustrates a system and method for providing color imaging in accordance with certain embodiments of the present invention.

FIG. 8 illustrates a method and system for color imaging using a single black and white area photo sensor 800. This technique reduces the number of sensor cells needed to obtain equivalent resolution and color imaging. The technique employs three ESHOEs 802, 804 and 806. The ESHOEs are reflective ASIF, Application Specific Integrated Filters.

Conventionally, color imagers employ mini color filters on each cell. For example a square array of four cells, one red, one blue and two green (for increased green sensitivity) would represent one color pixel.

In accordance with the present invention electrically switchable holographic filter elements are used to sequentially direct different color components of the color image to substantially all of the cells of the photo sensor. For example, the filter elements may be switchable between a first mode where a particular wavelength band is directed to the photo sensor and a second mode where incident light is directed to another switchable filter or light stop.

In the embodiment of FIG. 8 Red ESHOE 802, Green ESHOE 804 and Blue ESHOE 806 are used to sequentially direct filtered red, blue and green light to the photo detector. In this embodiment each cell of the photo detector may be used to detect the entire spectrum by sequentially directing red, green and blue light to the cell. This reduces the number of cells needed to achieve the same resolution as the conventional system described above. In operation an input colored image 808 would be directed at the stack of ESHOES through focusing optics 809. One ESHOE would illuminate the area sensor with its characteristic light color under command of control circuitry 810. At the same time the remaining ESHOES will transmit or steer their respective light colors away from the sensor to light stop 812. The ESHOEs would be activated one at a time to direct one color to the sensor while the other two colors are directed away.

From FIG. 8, it will be understood that when the Blue ESHOE directs light towards the area sensor, that the green and red light is transmitted through the other ESHOEs, towards the light stop, then the same for green light, then for red light. To image, the ESHOES must be sequentially activated at three times the frame rate. This is the cost of having fewer sensor cells. This technique can be coupled with the multiple field of view imager described above in Section I.

The described embodiments of the present invention are intended to be illustrative rather than restrictive, and are not intended to represent every embodiment of the present invention. Various modifications and variations can be made to the disclosure systems without departing from the spirit or scope of the invention as set forth in the following claims both literally and in equivalents recognized in law.

What is claimed is:

1. An optical code reading system comprising:

a photo sensor employing an array of cells for producing electrical signals responsive to an image directed to said sensor;

an optical system for focusing images corresponding to at least two fields of view which do not completely overlap, the optical system including at least one lens and at least one electrically switchable holographic optical element for switching between said fields of view, at least one of the at least one electrically switchable holographic optical element configured to direct an input light beam to the photo sensor via the at least one lens;

means for electrically controlling said electrically switchable holographic optical element to switch between the fields of view; and means for decoding data from the electrical signals corresponding to an optical code symbol contained in at least one of the images focused on the photo sensor.

2. The system of claim 1 further comprising processing means for stitching together image portions from at least two of the fields of view to form a composite image with resolution higher than the resolution obtainable with a single exposure of the photo sensor.

3. The system of claim 1 wherein the at least one electrically switchable holographic optical element has transparent plates and is located in the optical path.

4. The system of claim 1 wherein the electrically switchable holographic optical element is formed with a volume hologram which tilts an input optical path of the system when voltage is removed from the plates thereof.

5. An imaging system for reading an optical code symbol comprising:

a photo sensor having a two dimensional array of cells;

an optical system for directing images to the photo sensor, wherein the optical system includes at least one lens and an electrically switchable holographic optical element switchable between two states to vary the optical properties of the images and to direct the images to the photo sensor via the at least one lens; and means for switching the electrically switchable holographic optical element to select an image of the optical code symbol which is readily decodable.

6. The imaging system of claim 5 wherein at least two different system magnifications are selectively provided by switching the electrically switchable holographic optical element.

7. The imaging system of claim 5 wherein the electrically switchable holographic element is switched between two states which provides different focal distances.

8. An imager based optical code reading system with a range finder for determining the distance of an object in a field of view of the system comprising:

an image sensor having a primary input optical axis;

an electrically switchable holographic optical element for tilting the input optical axis of the image sensor;

means for detecting a shift in position of an image of the object on the image sensor caused by the tilting of the input optical axis; and means for determining the distance of the object by triangulation from the detected shift in position.

9. The system of claim 8 wherein the shift in position of the image of the object is detected by detecting a shift in position of an image of an edge of an optical code symbol on the object.

10. The system of claim 8 wherein the shift in position of the image of the object is detected by detecting a shift in position of an image of an aiming spot projected by the system onto the object.

11. The system of claim 8 further comprising means responsive to said distance determining means for adjusting the focal distance of the system.

12. A laser beam source for a laser optical code scanning system comprising:

a laser diode for producing a laser beam;

an electrically switchable holographic optical element in an output beam path of the laser diode formed with a volume hologram for selectively modifying the laser beam shape in response to a control signal; and control circuitry for switching the holographic optical element to restore and erase the volume hologram formed in the electrically switchable holographic optical element, wherein a return signal of detected reflections of the laser beam is monitored to determine the appropriate laser beam shape and the electrically switchable holographic optical element is controlled to produce said appropriate laser beam shape in response thereto.

13. The laser beam source of claim 12 wherein the volume hologram contains an interference pattern simulation of a cylindrical lens to produce an elliptical laser beam spot.

14. The laser beam source of claim 13 wherein the laser beam spot is switchable between an elliptical and a circular shape.

15. The laser beam source of claim 12 wherein the electrically switchable holographic optical element is reflective and functions as a moving mirror for scanning the laser beam across the optical code.

16. The laser beam source of claim 12 wherein plural transmission mode electrically switchable holographic optical elements are stacked together to provide multiple, switchable beam shaping functions.

17. The laser beam source of claim 12 wherein at least one electrically switchable holographic optical element controls beam ellipticity and at least one other electrically switchable holographic optical element controls the location of the narrowest portion of the laser beam waist.

18. The laser beam source of claim 17 wherein the electrically switchable holographic optical elements are controlled to produce said appropriate laser beam shape in response to the return signal.

19. A method for changing laser aiming patterns used for aiming an optical code reader comprising the steps of providing a diffractive optical element;

directing a coherent light beam at the diffractive optical element;

using the diffractive optical element to transform incident coherent light into at least two different aiming patterns, wherein a first pattern is projected at a relatively higher optical power and a second pattern is projected at a relatively lower optical power; and varying the power of the coherent light beam directed at the diffractive optical element to vary the appearance of the projected aiming pattern.

20. The method of claim 19 wherein the power of the coherent light beam is varied to selectively reduce the power level of the incident light beam a sufficient amount such that the first pattern is visible to a user and the second pattern is substantially invisible to the user.

21. The method of claim 19 wherein an electronic control switches the power of the coherent light beam to turn off part of the aiming pattern.

22. The method of claim 19 wherein the first pattern is a close range aiming pattern and the second pattern is a long range aiming pattern.

23. An apparatus for producing video signals corresponding to a color image comprising:

a photo sensor employing an array of cells for producing video signals in response to incident light;

an optical system comprising:
means for focusing an image on the photo sensor; and
filter means for selectively reflecting to the photo sensor different color components of the color image including electrically switchable holographic optical means; and means for electrically controlling said at least one electrically switchable holographic optical element to selectively reflect the different color components of the color image to the photo sensor.

24. The apparatus of claim 23 wherein the color components are red, green and blue light.

25. The apparatus of claim 24 wherein the filter means is an optical stack made up of at least three electrically switchable holographic elements, constituting red, green and blue filters, respectively.

26. The apparatus of claim 23 wherein the means for electrically controlling said at least one electrically switchable holographic optical element includes means for sequentially reflecting the different color components of the color image to substantially all of the cells of the photo sensor to sequentially detect red, green and blue light.

27. The apparatus of claim 23 wherein at least three electrically switchable holographic optical elements are located on an optical path of the apparatus and wherein
   a first electrically switchable holographic optical element is switchable between a first mode where a first wavelength band is reflected to the photo sensor and a second mode where the incident light is directed toward
   a second electrically switchable holographic optical element that is switchable between a first mode where a second wavelength band is reflected to the photo sensor and a second mode where the incident light is directed toward
   a third electrically switchable holographic optical element that is switchable between a first mode where a third wavelength band is reflected to the photo sensor and a second mode where the incident light is directed toward a light stop.

28. A laser beam source for a laser optical code scanning system comprising:
   a laser diode for producing a laser beam;
   an electrically switchable holographic optical element in an output beam path of the laser diode formed with a volume hologram for selectively modifying the laser beam shape in response to a control signal, the volume hologram being configured for producing a message upon illumination; and
   control circuitry for switching the holographic optical element to restore and erase the volume hologram formed in the electrically switchable holographic optical element.

* * * * *